United States Patent [19]

Behme et al.

[11] Patent Number: 6,040,375
[45] Date of Patent: Mar. 21, 2000

[54] COMPOSITE FOAMS, PROCESSES FOR THEIR PREPARATION AND THEIR USE

[75] Inventors: Klaus-Jürgen Behme, Eppstein; Rolf-Michael Jansen, Kelkheim; Andreas Zimmermann, Griesheim, all of Germany

[73] Assignee: Hoechst AG, Frankfurt, Germany

[21] Appl. No.: 08/869,864

[22] Filed: Jun. 2, 1997

Related U.S. Application Data

[63] Continuation of application No. 08/387,278, Feb. 13, 1995, abandoned.

[30] Foreign Application Priority Data

Feb. 15, 1994 [DE] Germany ............................ 44 04 701

[51] Int. Cl.[7] ................................ C08J 5/01; C08K 3/34
[52] U.S. Cl. ........................ 524/492; 524/493; 521/61; 521/64; 521/56; 528/10; 528/28; 528/48; 264/15; 264/28; 264/45.1
[58] Field of Search ............................ 521/61, 64, 56; 528/10, 28, 48; 264/15, 28, 45.1; 524/492, 493; 525/7.2

[56] References Cited

U.S. PATENT DOCUMENTS

| | | |
|---|---|---|
| 3,598,772 | 8/1971 | Hood et al. . |
| 4,048,272 | 9/1977 | Spicuzza et al. ............... 264/45.3 |
| 5,124,364 | 6/1992 | Wolff et al. ...................... 521/55 |
| 5,227,239 | 7/1993 | Upadhye et al. ............... 428/402 |

FOREIGN PATENT DOCUMENTS

| | | |
|---|---|---|
| 0 489 319 | 11/1991 | European Pat. Off. . |
| 0 513 573 | 4/1992 | European Pat. Off. . |
| 1 203 458 | 10/1965 | Germany . |
| 4342548 | 6/1995 | Germany . |
| 56-028225 | 3/1981 | Japan . |

OTHER PUBLICATIONS

European Patent Search Report, 95101990.0, Jul. 10, 1995.

Derwent Publications, Strong Lighweight Inorganic Board Mfg., JP 56028225.

*Primary Examiner*—Duc Troung
*Attorney, Agent, or Firm*—Connolly & Hutz

[57] ABSTRACT

The invention relates to a composite foam comprising from 10 to 90% by volume of $SiO_2$ aerogel particles and from 90 to 10% by volume of a foam, preferably a polyurethane and/or polyolefin foam, a process for its preparation and its use.

13 Claims, No Drawings

COMPOSITE FOAMS, PROCESSES FOR THEIR PREPARATION AND THEIR USE

This is a continuation of application Ser. No. 08/387,278, filed Feb. 13, 1995, now abandoned.

The invention relates to novel composite foams comprising $SiO_2$ aerogel particles and plastics foams, and to their preparation and use.

Conventional foams are prepared, as a rule, using organic blowing agents, such as fluorocarbons or chlorofluorocarbons (CFs or CFCs) or hydrocarbons (pentane isomers). The blowing agent enclosed in the cells of the foam is responsible for the high heat insulating capacity (thermal conductivity 0.020 to 0.040 W/mK). However, with a high halogen content, these blowing agents pollute the environment since they are at least partially emitted from the foam by diffusion. Owing to their flammability, the less environmentally polluting halogen-free hydrocarbons have disadvantages in the preparation and use of the foams.

$SiO_2$ aerogels have a heat insulating capacity typically superior to that of the foams. However, they cannot be prepared in any desired shape, are sensitive to fracture and have only little compressive strength.

$SiO_2$ aerogels can be prepared by a sol-gel process from suitable precursor materials in a solvent and subsequent drying at supercritical values of temperature and pressure. Such processes are described, for example, in EP-A-0 396 076 and WO 92/03378. However, this drying technique is very expensive.

It has also been disclosed in German Patent Application P 43 42 548.8 that $SiO_2$ gels can be dried under subcritical conditions if they are treated with a silylating agent before drying. The products prepared in this manner are often referred to as "$SiO_2$ xerogels". They are outstanding heat insulation materials and, in addition to $SiO_2$, contain only air (in the pores). However, they cannot be directly converted into any forms desired for heat insulation, and their mechanical strength is relatively low.

According to the above-mentioned German Patent Application (P 43 42 548.8), the $SiO_2$ xerogels are prepared by
  a) bringing an aqueous waterglass solution to a pH of $\leq 3.0$ with the aid of an acidic ion exchange resin or of a mineral acid,
  b) subjecting the resulting silica to polycondensation by adding a base to give an $SiO_2$ gel and, if a mineral acid was used in step a), washing the gel electrolyte-free with water,
  c) washing the gel obtained in step b) with an organic solvent until the water content of the gel is $\leq 5\%$ by weight,
  d) reacting the gel formed in step c) with a silylating agent and
  e) drying the silyated gel obtained in step d) at from −30 to 200° C. and from 0.001 to 20 bar.

In step a), an acidic ion exchange resin is preferably used; suitable ones are in particular those which contain sulfo groups. If mineral acids are used, hydrochloric acid and sulfuric acid are particularly suitable. The waterglass used is preferably sodium waterglass or potassium waterglass.

In step b), $NH_4OH$, NaOH, KOH, $Al(OH)_3$ or colloidal silica is generally used as the base. If a mineral acid was used if step a), the $SiO_2$ gel produced with the aid of the base is washed electrolyte-free with water; washing is preferably continued until the outflowing washwater has the same electrical conductivity as demineralized water.

Before step c), the gel is preferably allowed to age, in general at from 20 to 90° C., preferably at from 20 to 70° C., and at pH of from 6 to 11, preferably from 6 to 9. The time required for this purpose is in general from 1 to 48 hours, in particular from 1 to 24 hours.

In step c) the gel is preferably washed with an organic solvent until the water content of the gel is less than 2% by weight. The solvents used are in general aliphatic alcohols, ethers, esters or ketones, and aliphatic or aromatic hydrocarbons. Preferred solvents are methanol, ethanol, isopropanol, acetone, tetrahydrofuran, ethyl acetate, dioxane, n-hexane and toluene. Mixtures of the stated solvents may also be used. It is also possible first to wash out the water with an alcohol and then to wash out the latter with a hydrocarbon.

Steps a) to c) are carried out in general at a temperature between the freezing point of the solution and 70° C.

In step d), the solvent-containing gel is reacted with a silylating agent. The silylating agents used are in general silanes of the formula $R^1_{4-n}SiCl_n$ or $R^1_{4-n}Si(OR^2)_n$ where n=1 to 3, $R^1$ and $R^2$ independently of one another being $C_{1-C6}$ - alkyl, cyclohexyl or phenyl. Silazanes are also suitable. Mono-, di- or trimethylchlorosilane, trimethylmethoxysilane or hexamethyldisilazane are preferably used. The reaction is carried out in general at from 20 to 100° C., preferably from 30 to 70° C., if necessary in a solvent.

Before step e), the silylated gel is preferably washed with a protic or aprotic solvent until unconverted silylating agent has been substantially removed (residual content $\leq 1\%$ by weight). Suitable solvents are those stated for step c). Analogously, the solvents stated there as being preferred are also preferred here.

In step e), the gel which has been silylated and preferably then washed is dried at temperatures of from −30 to 200° C., preferably from 0 to 100° C., and pressures of from 0.001 to 20 bar, preferably from 0.01 to 5 bar, in particular from 0.1 to 2 bar. Temperatures higher than 200° C. and/or pressures higher than 20 bar are certainly possible but entail superfluous expense and have no advantages. The advantage of this process is that temperatures and pressures which are well below the critical temperatures and pressures of the conventional solvents are sufficient in the drying. The drying is in general continued until the gel has a residual solvent content of less than 0.1% by weight.

The $SiO_2$ xerogel particles prepared in this manner generally have a diameter of from 0.01 to 30 mm and a density of from 0.1 to 0.6 g/cm$^3$.

The thermal conductivity of such an $SiO_2$ particle is from 0.01 to 0.025 W/mK. The thermal conductivity ($\lambda$ value) of a bed of such particles is dependent on the particle size. A bed comprising large particles contains large, air-filled cavities, and the bed therefore has virtually the same $\lambda$ value as air (0.024 W/mK), as shown in Table 1.

TABLE 1

| Particle size (mm) | Particle shape | Thermal conductivity (W/mK, 24° C.) |
|---|---|---|
| 10–30 | Rods | 0.033 |
| 1–5 | Granules | 0.024 |
| <1 | Powder | 0.021 |

The use or concomitant use of small $SiO_2$ particles (diameter<1 mm) leads to a further reduction in the thermal conductivity, as is evident from Table 1.

It has now been found that heat insulating materials having a high mechanical strength and high heat insulating capacity can be prepared in any geometric shapes if $SiO_2$ aerogel particles are surrounded with foam. For this purpose, $SiO_2$ aerogel particles are poured into a correspondingly shaped contained, and a mixture which contains the components required for the foam synthesis is added. The curing foam surrounds the particles and binds them with one another in the intended shape. The volume of the bed of particles should be from 10 to 90% of the volume of the prepared composite foam, i.e. from 10 to 90% of the volume of the shaped container in which said foam is prepared. From 90 to 10% of the volume of the prepared composite foam are accounted for by the foam.

The invention therefore relates to a composite foam comprising.

a) 10–90% by volume of $SiO_2$ aerogel particles and b) 90–10% by volume of a plastics foam.

The percentages by volume are based on the volume of the prepared composite foam.

The aerogels are prepared by drying a suitable gel. According to the invention, aerogels in the wider sense are to be understood as meaning "gels having air as a dispersant".

In this context, the term "aerogel" covers aerogels in the narrower sense, xerogels and cryogels. A dried gel is defined as an aerogel in the narrower sense if the liquid of the gel is removed at temperatures above the critical temperature and starting from pressures above the critical pressure. If, on the other hand, the liquid of the gel is removed subcritical, for example with formation of a limiting liquid/vapor phase, the resulting gel is then defined as a xerogel.

According to the invention, aerogels dried under subcritical conditions (so-called xerogels) are preferably used. Compared with aerogels dried under supercritical conditions, they can be prepared in a simpler manner, i.e. at lower temperatures and lower pressures, and, owing to the groups introduced by the silylation (preferably trimethylsilyl groups), are permanently hydrophobic.

The aerogel or xerogel particles used according to the invention preferably have porosities of more than 60% and densities of less than 0.6 g/cm$^3$. In addition, the diameter of the gel particles is preferably in the range from 0.01 to 30 mm.

According to the invention, the plastics foam used is preferably a polyurethane and/or polyolefin foam.

The polyolefin used may be, for example, linear low density polyethylene (LLDPE), a high density polyethylene (HDPE) or an ethylene/vinyl acetate (EVA) and a polypropylene homo- or copolymer.

The preparation and use of polyolefin foams is known and is described, for example, in Ullmann's Encyclopedia of Industrial Chemistry, Vol. A11, in particular on pages 439 to 444.

Polyurethane is a particularly preferred plastics foam.

The preparation and use of polyurethane foams are known and are described, for example, in Kunststoff-Handbuch [Plastics Manual], Volume VII, Polyurethane [Polyurethanes], Carl Hanser-Verlag Munich, Vienna, 3rd Edition (1993), in particular pages 271–282, and in EP-A-0 077 964, EP-A-0 334 059 and German Auslegeschrift 1,964,138 (British Patent 1,209,243).

In Ullmanns Enzyklopädie der technischen Chemie [Ullmann's Encyclopedia of Industrial Chemistry] (1980), Volume 19, pages 301 to 341, the suitable raw materials and the possible processes for the preparation of polyurethane rigid foams are summarized.

Furthermore, appropriate information is to be found in Kirk-Othmer, Encyclopedia of Chemical Technology, 3rd Edition, Vol. 11 (1980), pages 87–89, and Vol. 23 (1983), pages 576–607.

The blowing agent used for the polyurethane is preferably $CO_2$, which is produced in the polyurethane synthesis from polyisocyanates and compounds having at least two hydrogen atoms reactive toward isocyanate groups (and, if required, further conventional additives) by adding water. Instead of $CO_2$, so-called "physical blowing agents" may also be used, namely readily volatile organic substances, for example hydrocarbons or halogenated hydrocarbons. However, these have the disadvantages described at the outset.

However, polycarbonate-, polysulfone-, poly(phenylene oxide)-, polyamide-, poly(methyl acrylate)-, polymethacrylamide-, poluimide-, epoxy- and silicone foams, foams of phenol-, urethane- and melamine-formaldehyde resins and polyvinyl chloride (PVC) foams may also be used according to the invention as plastics foam.

The composite foams according to the invention preferably have a density of 0.05 to 0.6 g/cm$^3$. Their thermal conductivity is preferably in the range from 0.015 to 0.040 W/mK.

The invention furthermore relates to a process for the preparation of a composite foam, which comprises surrounding a bed of $SiO_2$ aerogel particles with plastics foam, the volume of the bed being 10 to 90% by volume of the intended volume of the composite foam.

The composite foams thus prepared can be used for heat insulation, for example as construction panels or construction elements or as components of refrigerating equipment and other heat-insulating hollow articles.

The invention is to be illustrated in more detail below by means of an example.

EXAMPLE a) Preparation of $SiO_2$ xerogel granules 2 l of a sodium waterglass solution ($SiO_2$ content 6% by weight and $Na_2O$:$SiO_2$ ratio 2:3) were passed over a jacketed column (length=100 cm, diameter=8 cm) which contained 1 l of an acidic ion exchange resin (styrene/divinylbenzene copolymer having sulfo groups, commercially available under the name ®Duolite C 20) (about 70 ml/min). The column was operated at a temperature of 5° C. The silica solution flowing out at the lower end of the column had a pH of 1.2. This solution was brought to a pH of 5.5 with a 0.5 molar $NH_4OH$ solution and then sprayed with the aid of an ultrasonic nozzle. The moist gel granules were aged for a further 24 hours at 50° C. and at a pH of 6. Thereafter, the water was extracted with 6 l of acetone at 50° C. and the acetone-containing gel was silylated with trimethylchlorosilane (TMCS) (0.05 g of TMCS per gram of wet gel, reaction time 4 hours at 50° C.) and then rinsed again with 1 l of acetone. The drying of the gel was carried out in the air (3 hours at 40° C., then 2 hours at 50° C. and 12 hours at 150° C.).

The transparent $SiO_2$ xerogel granules thus obtained had a bulk density of about 0.1 g/cm$^3$. The BET specific surface area was 950 m$^2$/g and the thermal conductivity was 0.021 W/mK. The particle diameter was from 0.1 to 1 mm.

The thermal conductivity was measured with a heating wire method (see for example: O. Nielsson, G. Rüschenpöhler, J. Groβ, J. Fricke, High Temperatures-High Pressures, Vol. 21, 267–274 (1989)).

b) Preparation of an $SiO_2$ xerogel/polyurethane composite foam

A non-gas-tight sheet mold measuring 50 cm×50 cm×4 cm was virtually completely filled with 800 g of the $SiO_2$ xerogel particles prepared under a), after which a mixture having the following composition was added:

65 g of a polyether which had a hydroxyl number of 35 and was obtained by an addition reaction of propylene oxide and ethylene oxide with glycerol, 20 g of a polyether having a hydroxyl number of 380 and based on an adduct of sucrose, propylene glycol and propylene oxide, 15 g of a reaction product of 1 mol of nonylphenol and 8 mol of ethylene oxide, 20 g of water, 1 g of a siloxane polyether copolymer as a foam stabilizer, 2 g of dimethylethanolamine, 0.2 g of bis(dimethylaminoethyl) ether and 120 g of crude 4,4'-dicyanatodiphenylmethane.

The mold was then closed, after which the $SiO_2$ xerogel particles were surrounded by the polyurethane foam which was forming. A molding time of 10 minutes resulted in a rigid composite foam panel having a density of 0.14 g/cm$^3$ and an initial thermal conductivity of 0.020 W/mK, which increased to 0.022 W/mK in the course of 1 week. This value was unchanged after further storage for 2 months. The composite foam contained 80% by volume of $SiO_2$ xerogel particles and 20% by volume of polyurethane foam.

What is claimed is:

1. A composite foam comprising
   (a) 10 to 90% by volume of $SiO_2$ aerogel which has been silylated and then dried under subcritical conditions to form xerogel particles having a particle size range of 0.01 mm to about 30 mm, and
   (b) 90 to 10% by volume of a blown plastic foam;
   said composite foam having thermal conductivity of from 0.015 to 0.040 W/mK.

2. The composite foam as claimed in claim 1, wherein the aerogel particles have porosities of more than 60% and densities of less than 0.6 g/cm$^3$.

3. The composite foam as claimed in claim 1, wherein the plastics foam is a polyurethane and/or polyolefin foam.

4. The composite foam as claimed in claim 3, wherein the plastics foam is a polyurethane foam which is expanded with the aid of $CO_2$ as a blowing agent.

5. A heat insulation material, comprising the composite foam as claimed in claim 1.

6. The composite foam as claimed in claim 1, wherein the $SiO_2$ aerogel particles have diameters of from 0.1 to 1 mm.

7. A composite foam as claimed in claim 1, wherein the amount of said xerogel particles is at least 80% by volume.

8. A composite foam comprising
   a) 10–90% by volume of $SiO_2$ aerogel which has been silylated to form xerogel particles and
   b) 90–10% by volume of a plastic foam.

9. The composite foam as claimed in claim 1, wherein the $SiO_2$ aerogel particles have diameters in the range from 0.01 mm to about 30 mm.

10. The composite foam as claimed in claim 1, wherein the aerogel particles have been silylated with a silane of the formula $R^1_{4-n}SiCl_n$ or $R^1_{4-n}Si(OR^2)_n$, where n is a number from 1 to 3, and $R^1$ and $R^2$, independently of one another, are $C_1$–$C_6$-alkyl, cyclohexyl or phenyl.

11. A composite foam comprising
   (a) 10 to 90% by volume of silylated, permanently hydrophobic $SiO_2$ aerogel particles having a particle size range of 0.01 to 5 mm, said particles having porosities of more than 60% and densities of less than 0.6 g/cm$^3$; said particles being surrounded by and bound to one another by
   (b) 90 to 10% by weight of a blown plastic foam expanded with the aid of a blowing agent comprising carbon dioxide,
   said composite foam having an essentially unchanging thermal conductivity of from 0.015 to 0.040 W/mK.

12. The composite foam as claimed in claim 11, wherein said blown plastic foam comprises a polyurethane foam, and the blowing agent for said foam comprises carbon dioxide generated during the synthesis of polyurethane from a precursor containing isocyanate groups by interaction between the isocyanate groups and a compound having at least two isocyanate-reactive hydrogens.

13. The composite foam as claimed in claim 11, wherein the silylated $SiO_2$ aerogel particles have been silylated with a silane of the formula $R^1_{4-n}SiCl_n$ or $R^1_{4-n}Si(OR^2)_n$, where n is a number from 1 to 3, and $R^1$ and $R^2$, independently of one another, are $C_1$–$C_6$-alkyl, cyclohexyl or phenyl.

* * * * *